Patented Nov. 16, 1943

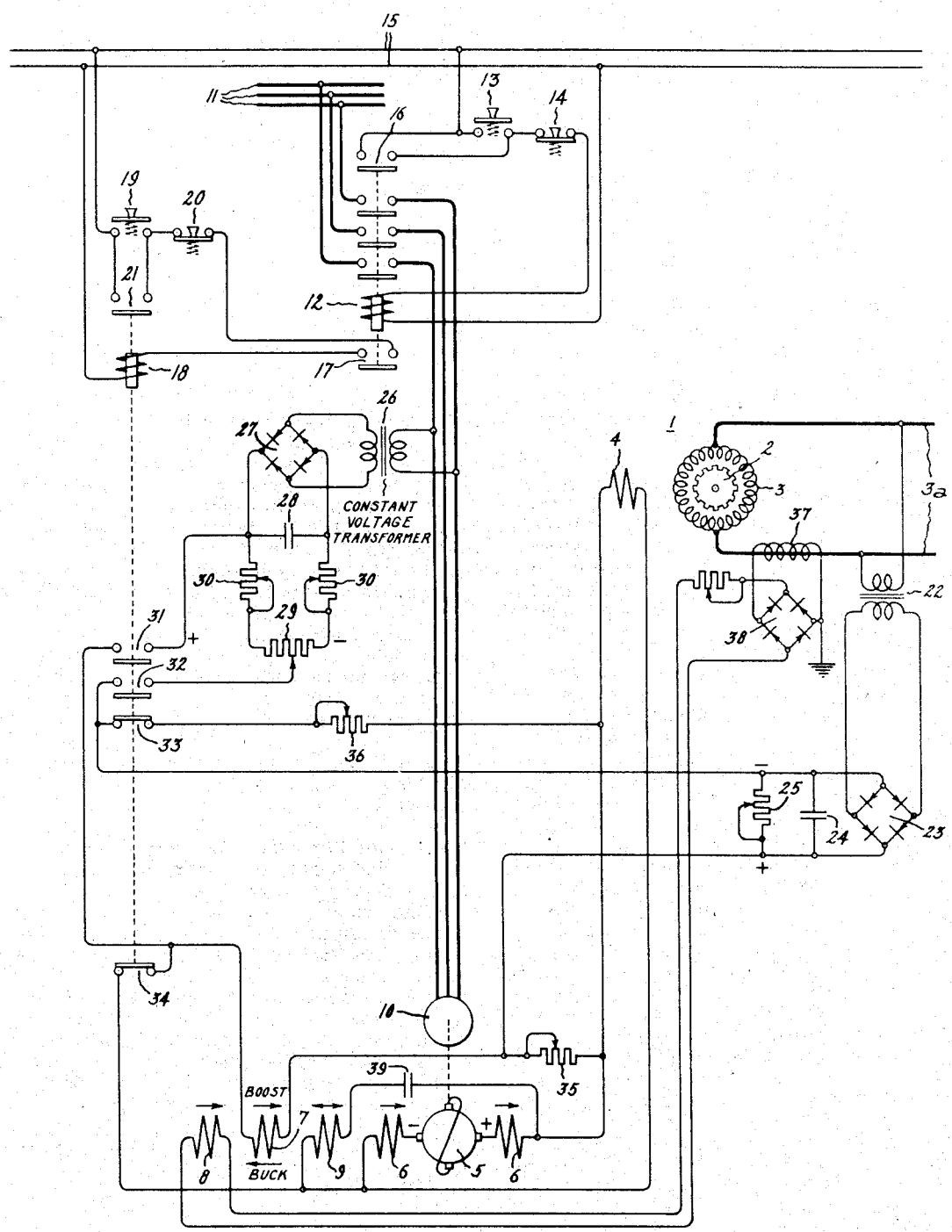

2,334,179

UNITED STATES PATENT OFFICE 2,334,179

REGULATING AND CONTROL CIRCUIT

Martin A. Edwards, Scotia, and Donald E. Garr, Schenectady, N. Y., assignors to General Electric Company, a corporation of New York Application December 16, 1941, Serial No. 423,205

18 Claims. (Cl. 171—119)

This invention relates to regulating and control circuits for electrical apparatus and more particularly to improvements in the control and automatic voltage regulation of dynamo-electric generators.

By "control" is meant the change in an operating condition of a machine from one value to another, as distinguished from "regulation" wherein the condition is maintained substantially constant at a predetermined value. For example, in the case of high frequency alternators for supplying current to heating loads, such as induction furnaces, it is desirable to be able to drop the load quickly at the proper time. When this is done by means of main line contacts the operation of the system is sometimes unsatisfactory because high frequency current flowing through contactor tips gives heating troubles and adds to the maintenance required. In accordance with this invention the load is effectively connected and disconnected from the high frequency generator by high speed voltage control of the generator. Thus, if the voltage of the main generator is reduced quickly to about ten per cent of its normal value, the heating effect, which varies with the square of the current, will be reduced to a negligible amount. In such high frequency heating circuits the inherent voltage regulation is quite poor and therefore it is desirable to provide the system with automatic voltage regulating means for maintaining substantially constant voltage with variations in circuit conditions, such as load and load power factor.

An object of the invention is to provide a new and improved control circuit for electrical machines.

Another object of the invention is to provide a new and improved automatic regulating circuit for electrical machines.

A further object of the invention is to provide a new and improved combined control and regulating circuit for dynamo-electric machines.

The invention will be better understood from the following description taken in connection with the accompanying drawing and its scope will be pointed out in the appended claims.

In the accompanying drawing there is shown diagrammatically an embodiment of the invention applied by way of example to the regulation and control of a high frequency induction alternator 1 having a massive iron rotor 2 which is driven by any suitable prime mover (not shown) and which is provided with a main or armature winding 3 and an exciting or control winding 4, the former being an alternating-current winding and the latter being a direct-current winding. The terminals of the winding 3 are connected to a load circuit 32 which supplies current to a suitable load, such as an induction furnace.

Regulation and control of the voltage of alternator 1 is attained by means of an auxiliary generator 5 which is connected to control the current in the field winding 4. Generator 5 is preferably of the cross armature reaction excited direct armature reaction compensated type. The details of this type of machine are disclosed and claimed in Patent 2,227,992, granted January 7, 1941, on an application of M. A. Edwards and E. F. W. Alexanderson and assigned to the assignee of the present application. This machine has an armature which is similar to that of a conventional direct-current dynamo-electric machine. However, it is provided with two sets of brushes whose axes are displaced substantially ninety electrical degrees from each other. One set of brushes is along the direct axis of the machine and constitutes the load brushes. In circuit with these brushes is a compensating winding or windings 6 for substantially neutralizing or compensating for the direct armature reaction produced by current flow between the main or direct axis brushes. The other set of brushes is interconnected by a low resistance connection so as to provide a virtual short circuit of the armature along its cross or quadrature axis. A control field winding 7 is mounted along the direct axis of the machine. Also mounted along this axis is a compounding field winding 8 and if desired an anti-hunting winding 9.

The auxiliary generator 5 is driven by a motor 10 such, for example, as a three-phase induction motor which is energized from a suitable supply circuit 11. The starting and stopping of this motor is under the control of a line contactor 12 which in turn is manually controlled by a set of "start" and "stop" push button switches 13 and 14, the operating current for the contactor being supplied from a suitable source of control current 15. The contactor is provided with a conventional seal-in or interlock contact 16 so that the "start" button 13 need be depressed or closed but momentarily in order to start and continue the operation of the motor. The contactor 12 is also provided with an additional interlock contact 17 in the circuit of an "on-off" relay 18 for selectively changing the circuit of the control field 7 of the auxiliary generator so as to provide either automatic voltage regulation of the main generator 1 or substantially instantaneous and substantial reduction of the voltage of the main generator.

This "on-off" contactor is in turn controlled by any suitable means, such as "on" and "off" push button switches 19 and 20, and the relay is provided with seal-in contacts 21 for holding the relay energized after a momentary closure of the "on" button until such time as the "off" button is operated.

For controlling the voltage of the auxiliary generator there is provided a potential transformer 22 whose primary winding is connected across the load circuit 3a and whose secondary winding is connected to the input terminals of a full-wave rectifier 23. A capacitor 24 is connected across the output terminals of the rectifier for improving its wave form and a rheostat 25 is also connected across the output terminals. The voltage drop in this rheostat is proportional in magnitude to the voltage of the main load circuit 4 and thus inserts such a voltage in any control circuit in which it is connected but as it is a resistor it will permit the flow of current through it in either direction. In order to provide a suitable reference standard for the voltage regulation there is provided a source of constant voltage which may conveniently be derived from the supply circuit for the motor 10 by means of a constant voltage transformer 26 of any suitable type. As shown, this transformer is connected across one phase of the supply circuit and its constant voltage output or secondary winding is connected to a rectifier 27. Across the output terminals of this rectifier are connected a capacitor 28 and a rheostat or potentiometer 29, the functions of which correspond to the functions of capacitor 24 and rheostat 25 respectively. This circuit may also be provided with series rheostats 30, if desired, for providing further adjustment of the magnitude of the constant reference voltage.

The "on-off" relay 18 is provided with two sets of contacts 31 and 32 which are open in the "off" position of the relay and which are closed in the "on" position thereof. These contacts when closed connect the rheostats 25 and 29 in series with each other and in series with the control field winding 7. The "on-off" relay is also provided with sets of contacts 33 and 34 which are open in the "on" position of the relay and which are closed in the "off" position of the relay and which when they are closed connect the control field winding 7 across the output circuit of the auxiliary generator through a resistance 35 across which the rheostat 25 is connected through the entire resistance 36.

The compounding winding 8 is energized in proportion to the load current on the main generator 1 by means of a current transformer 37 and a rectifier 38. The anti-hunting winding is connected across the output circuit of the auxiliary generator through a capacitor 39.

The operation of the illustrated embodiment of the invention is as follows. Assume that generator 1 is being operated at normal speed and that it is desired to provide automatic regulation of its voltage. "Start" push button 13 will then be depressed momentarily until line contactor 12 picks up and seals in, thus starting the motor 10 which will quickly come up to speed and will in turn bring the armature of the auxiliary generator 5 up to speed. The "on" push button 19 is then depressed causing the "on-off" relay 18 to pick up and seal itself in. The polarities of the rectifiers 23 and 27 are such that the polarities of the voltages or voltage drops in the resistors 25 and 29 are in opposition to each other in the circuit for the control field winding 7 which is completed through these resistors by means of the contacts 31 and 32 which have been closed by the picking up of the relay 18. If the voltage of the resistor 25 falls below the voltage of the resistors 29 and 30 the current through the control field winding 7 will be in such direction that it excites the auxiliary generator in the direction for raising the voltage of the generator 1. The corresponding direction of mmf. of the control winding 7 is indicated by the arrow adjacent thereto which is labeled "boost." On the other hand, if the voltage of the generator 1 rises above the desired value, as determined by the setting of the rheostat 29, the current and hence the mmf. of the winding 7 will reverse so that it will be in the direction of the arrow labeled "buck" adjacent this field winding. This reverses the polarity of the auxiliary generator 5 and tends quickly to lower or reduce the current in the field winding 4. As soon as this current falls slightly, the generator voltage will also fall and when it falls below normal the control field current will again reverse. In this manner the voltage of the main generator is maintained constant by the rapid reversals in polarity of the auxiliary generator 5. By reason of the relatively high inductance of the field winding 4 and the massive iron rotor of the main generator, the changes in current in the field winding 4 are relatively slow so that the voltage of generator 4 is maintained at a steady value. The polarity of the auxiliary generator 5 corresponding to the average value of current in the field winding 4 necessary to maintain constant voltage is indicated by the polarity marks associated with the load circuit of the generator 5.

The reason the auxiliary generator 5 is called a cross armature reaction excited machine is that the flux which produces the voltage across the main or direct axis brushes is produced by the reaction of current flowing through the armature and returning through the low resistance or short circuit connection between the cross armature or quadrature axis brushes. This is a relatively heavy current by reason of the low resistance of the circuit. The small voltage necessary to produce this heavy current is induced between the cross axis brushes by means of the control field winding whose axis is along the direct axis of the machine. As the amount of flux produced by the control field winding is relatively small this winding need have but a few turns so that it has a very low inductance and consequently very slight changes in voltage in its circuit will produce rapid changes in current therein. Also, as the cross armature reaction flux is produced by a heavy current and few turns, the inductance of this exciting circuit is low so that the speed of response and amplification ratio of the auxiliary machine are both very high.

The compounding field winding 8 serves to relieve the main control winding 7 of some of its duty. Thus, the mmf. of this winding is in the same direction as the boosting mmf. of the control field winding 7. Consequently, increases in load current provide additional excitation along the direct axis of the auxiliary machine so as to provide either flat, rising or drooping compounding.

The anti-hunting winding being connected across the auxiliary machine through a capacitor will have no current when the voltage of the auxiliary machine is constant. However, when the voltage of the auxiliary machine changes, the current in the anti-hunting winding will be in such direction as to oppose the voltage change of the auxiliary machine. In this manner hunting or overshooting of the regulating system is controlled.

When it is desired to remove the load from the main generator the "off" button 20 is depressed thereby deenergizing the relay 18 and causing contacts 31 and 32 to open and contacts 33 and 34 to close. The closure of contacts 34 connects the main control winding 7 across the output circuit of the auxiliary machine with such polarity as to cause the voltage of the auxiliary machine to energize the control winding in the bucking direction. In other words, it is a sort of "suicide" effect in that the voltage of the machine is used to kill itself. In order to accelerate this effect the contacts 33 connect the resistor 25 across the resistor 35 through the resistor 36. Thus, the voltage drop across the resistor 25 is connected into the circuit of the main control field winding 7 with such polarity as to aid the polarity of the auxiliary machine in bucking down or killing the voltage of the auxiliary machine. Therefore, the higher the voltage of the main generator the greater the effect tending to reduce the main generator voltage. In operation the voltage of the main generator is rapidly reduced to a low value but it cannot fall to zero because of the residual voltage of the machines. However, with a heating load which depends upon the square of the current a reduction of the main generator voltage to approximately ten per cent of its normal value will reduce the heating effect of the current to a negligible value.

The time constant of the alternator 1 is relatively long compared with the time constant of the auxiliary exciting generator 5. By "time constant" is meant generally the time lag between a change in field voltage and the final resulting value of armature voltage. One reason for this is the high inductance of the solid rotor 2 of the alternator 1. In fact, it has been found that in such an alternator the armature voltage actually lags behind the change in field current and field flux so that there will still be a certain amount of armature voltage after the residual flux of the machine has been reversed. As a result of this it has been found that if the reference voltage which is controlled by the rheostat 29 is adjusted to zero value the alternator voltage instead of going to zero goes to its ceiling value. This is because the voltage across the rheostat 25 which is a measure of the alternator voltage is unopposed and therefore energizes the control field winding 7 in such a direction as to buck the voltage of the auxiliary generator to zero and then reverse its polarity and cause its voltage to build up in the opposite direction. This rapidly reduces the current in the field winding 4 of the main alternator and as the current in this field winding and consequently the flux which it produces pass through zero and start to reverse, the time lag in the alternator is such that there is still a certain amount of alternator voltage and consequently a certain amount of voltage across the rheostat 25. Therefore, this voltage continues to energize the control field winding 7 with the result that the alternator voltage builds up again to higher and higher values until its ceiling value is reached. The only difference is that the phase of the alternator voltage has been reversed but the full-wave rectifier 23 does not discriminate between reversals of phase of the alternating wave.

In order to prevent this objectionable operation the resistor 30 serves the additional purpose of preventing the reference voltage from being adjusted to zero. Thus, it will be seen that the reference voltage is actually the sum of the voltages across the rheostats 29 and 30 so that when the rheostat 29 is adjusted to its zero voltage position the voltage drop in the rheostat 30 will provide a definite increment of voltage for preventing the main alternator voltage from falling completely to zero.

The same loss of control and improper operation would also result if the armature voltage of the auxiliary machine 5 were not combined with the voltage across the resistor 25 when the regulator is taken out of service and it is desired to reduce the main generator voltage rapidly. However, as soon as the polarity of the auxiliary machine 5 reverses, its voltage will oppose the voltage of the resistor 25 so that the voltage of the main generator will never build down quite to zero. In other words, there will be zero control excitation on the auxiliary machine 5 when the main alternator voltage is five or ten per cent of its normal value.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What we claim as new and desire to secure by Letters Patent of the United States, is:

1. In combination, a main dynamo-electric generator having a field winding, means for controlling the energization of said field winding comprising an auxiliary generator having a control field winding, regulating means responsive to the voltage of said main generator for controlling the energization of said control field winding so as to maintain substantially constant main generator voltage, and control means for incapacitating said regulating means and producing rapid decrease in the voltage of said main generator by applying the voltage thereof to said control field winding with such polarity that the excitation of said main generator is substantially reduced.

2. In combination, a main dynamo-electric machine having a field winding, means for controlling the energization of said field winding comprising an auxiliary generator having a control field winding, regulating means responsive to an operating condition of said dynamo-electric machine for controlling the energization of said control field winding so as to maintain said operating condition substantially constant, and control means for incapacitating said regulating means and for producing rapid decrease in the value of said operating condition by applying a voltage proportional thereto to said control field winding with such polarity that the excitation of said main generator is reduced.

3. In combination, a main dynamo-electric generator having a field winding, means for controlling the energization of said field winding comprising an auxiliary generator of the cross armature excited direct armature compensated type, said auxiliary generator having a control field winding, regulating means responsive to the voltage of said main generator for controlling the energization of said control field winding so as to maintain substantially constant main generator voltage, and control means for incapacitating said regulating means and producing rapid decrease in the voltage of said main generator by applying the voltage thereof to said control field winding with such polarity that the excitation of said main generator is substantially reduced.

4. In combination, a main dynamo-electric generator having a field winding, means for controlling the energization of said field winding comprising an auxiliary generator of the cross armature excited direct armature compensated type, said auxiliary generator having a control field winding, regulating means responsive to the difference between a constant voltage and the voltage of said main generator for controlling the energization of said control field winding so as to maintain substantially constant main generator voltage, and control means for incapacitating said regulating means and producing rapid decrease in the voltage of said main generator by applying the voltage thereof to said control field winding with such polarity that the excitation of said main generator is substantially reduced.

5. In the combination as set forth in claim 1, an additional control field winding on said auxiliary generator, and means for energizing said field winding in proportion to the current of said main generator.

6. In the combination as set forth in claim 2, an additional control field winding on said auxiliary generator, and means for energizing said additional control field winding in proportion to the current of said main dynamo-electric machine.

7. In the combination as set forth in claim 3, an additional control field winding on said auxiliary generator, and means for energizing said additional field winding in proportion to the current in said main generator and with such polarity as to produce accumulative compounding effect on said main generator.

8. In combination, a main dynamo-electric generator having a field winding, means for controlling the energization of said field winding comprising an auxiliary generator having a control field winding, regulating means responsive to the voltage of said main generator for controlling the energization of said control field winding so as to maintain substantially constant main generator voltage, and control means for incapacitating said regulating means and producing rapid decrease in the voltage of said main generator by applying the voltage of said auxiliary generator to said control field winding with such polarity that the excitation of said main generator is substantially reduced.

9. In combination, a main dynamo-electric machine having a field winding, means for controlling the energization of said field winding comprising an auxiliary generator having a control field winding, regulating means responsive to an operating condition of said dynamo-electric machine for controlling the energization of said control field winding so as to maintain said operating condition substantially constant, and control means for incapacitating said regulating means and for producing rapid decrease in the value of said operating condition by applying the voltage of said auxiliary generator to said control field winding with such polarity that the excitation of said main generator is reduced.

10. In combination, a main dynamo-electric generator having a field winding, means for controlling the energization of said field winding comprising an auxiliary generator of the cross armature excited direct armature compensated type, said auxiliary generator having a control field winding, regulating means responsive to the voltage of said main generator for controlling the energization of said control field winding so as to maintain substantially constant main generator voltage, and control means for incapacitating said regulating means and producing rapid decrease in the voltage of said main generator by applying the voltage of said auxiliary generator to said control field winding with such polarity that the excitation of said main generator is substantially reduced.

11. In combination, a main dynamo-electric generator having a field winding, means for controlling the energization of said field winding comprising an auxiliary generator of the cross armature excited direct armature compensated type, said auxiliary generator having a control field winding, regulating means responsive to the difference between a constant voltage and the voltage of said main generator for controlling the energization of said control field winding so as to maintain substantially constant main generator voltage, and control means for incapacitating said regulating mens and producing rapid decrease in the voltage of said main generator by applying the voltage of said auxiliary generator to said control field winding with such polarity that the excitation of said main generator is substantially reduced.

12. In the combination as set forth in claim 8, said control means including means for adding the voltage of said main generator to the voltage of said auxiliary generator with the same polarity for increasing the rate of decrease of main generator voltage.

13. In the combination as set forth in claim 9, additional means in said control means for adding a voltage proportional to the value of said operating condition to the voltage of said auxiliary generator for increasing the rate of decrease of the value of said condition.

14. In the combination as set forth in claim 10, additional means included in said control means for adding the voltage of said main generator to the voltage of said auxiliary generator for strengthening the energization of said control field winding in the direction for reducing the voltage of said main generator.

15. In the combination as set forth in claim 11, additional means included in said control means for adding the voltage of said main generator to the voltage of said auxiliary generator for increasing the energization of said control field winding in the direction for reducing the voltage of said main generator.

16. In combination, a high frequency alternator having a field winding, means for controlling the energization of said field winding comprising an auxiliary generator having a control field winding, regulating means responsive to the voltage of said alternator for controlling the energization of said control field winding so as to maintain substantially constant alternator voltage, control means for incapacitating said regulating means and producing rapid decrease in the voltage of said alternator by applying the voltage of said auxiliary generator to said control field winding with such polarity that the excitation of said alternator is substantially reduced, said control means including means for adding the voltage of said alternator to the voltage of said auxiliary generator with the same polarity for increasing the rate of decrease of alternator voltage, an additional control field winding on said auxiliary generator, and means including a rectifier for energizing said additional control field winding in proportion to the current of said alternator.

17. In combination, a high frequency alternator having a field winding, means for controlling the energization of said field winding comprising an auxiliary generator of the cross armature excited direct armature compensated type, said auxiliary generator having a control field winding, regulating means responsive to the voltage of said alternator for controlling the energization of said control field winding so as to maintain substantially constant alternator voltage, control means for incapacitating said regulating means and producing rapid decrease in the voltage of said alternator by applying the voltage of said auxiliary generator to said control field winding with such polarity that the excitation of said alternator is substantially reduced, additional means included in said control means for adding the voltage of said alternator to the voltage of said auxiliary generator for strengthening the energization of said control field winding in the direction for reducing the voltage of said alternator, an additional control field winding on said auxiliary generator, and means including a rectifier for energizing said additional control field winding in proportion to the current of said alternator.

18. In combination, a main generator, an auxiliary direct-current generator for supplying excitation to said main generator, selectively controllable means for exciting said auxiliary generator with a voltage which is proportional to the voltage of said main generator and which has a polarity such as to reduce the voltage of said main generator, and means for connecting a voltage which is a measure of the voltage of said auxiliary generator in series with said voltage which is proportional to said main generator, said voltages having aiding polarities whereby reversal of polarity of said auxiliary generator will prevent reversal of the residual flux of said main generator.

MARTIN A. EDWARDS.
DONALD E. GARR.